United States Patent Office 3,526,643
Patented Sept. 1, 1970

3,526,643
METHOD OF OBTAINING N,N-BIS-(2-CHLORO-ETHYL)-HYDRAZONES OF THE 5-NITRO-FURAN SERIES
Solomon Aronovich Giller, Ulitsa Pernavas 10, kv. 76; Marger Jurievich Lidaka, Ulitsa Zalves 74, kv. 1; Karl Karlovich Venter, Ulitsa Mezhotnes 37, kv. 1; Renata Jurievna Kalnberga, Ulitsa Engelsa 111a kv. 9; Aina Avgustovna Ziderman, Ulitsa Kr. Barona 109, kv. 22; and Anda Zhanovna Dauvarte, Ulitsa Araishu. 31, kv. 1, all of Riga, U.S.S.R.
No Drawing. Filed Aug. 23, 1967, Ser. No. 662,590
Int. Cl. C07d 5/30
U.S. Cl. 260—347.7          13 Claims

ABSTRACT OF THE DISCLOSURE

Novel compounds of the formula:

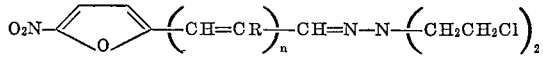

wherein $n$ is an integer between 0 and 4 and when $n$ is other than 0, R is hydrogen, lower alkyl or ethoxymethyl are produced by a method comprising mixing an aqueous solution of N,N-bis-(2-chloroethyl)-hydrazine hydrochloride with a water-miscible, lower alkanol solution of an aldehyde of the formula:

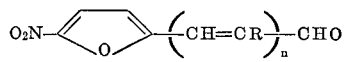

wherein $n$ and R are as defined above, at a temperature at least 20° C. below the melting point of the desired compound.

---

The present invention relates to novel chemical compounds and, more particularly, to N,N-bis-(2-chloroethyl)-hydrazone derivatives of the 5-nitrofuran series, of the formula:

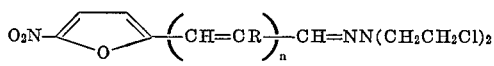

wherein R is —H, —lower alkyl or ethoxymehtyl and $n$ is an integer between 0 and 4.

Said compounds can be used in medicine as anti-tumor agents and as intermediate compounds in organic synthesis.

The present invention is also concerned with a method of producing said compounds, wherein solutions of aldehydes of the 5-nitrofuran series in an organic water-miscible solvent, preferably in a saturated monohydric alcohol, are mixed with an aqueous solution of N,N-bis-(2-chloroethyl)-hydrazine hydrochloride at a temperature of at least 20° C. below the melting point of the final reaction products.

According to said method, the solutions of aldehydes of the 5-nitrofuran series can be obtained by treating the diacetate derivatives of said aldehydes with a mineral acid (for the hydrolysis of the diacetyl groups) with subsequent or simultaneous addition of a saturated monohydric alcohol.

The present method of obtaining N,N-bis-(2-chloroethyl)-hydrazones of the 5-nitrofuran series is carried out in the following way.

To a solution of the corresponding aldehyde of the 5-nitrofuran series in an organic water-miscible solvent, preferably in a monohydric saturated alcohol, is added an aqueous solution of N,N-bis-(2-chloroethyl)-hydrazine hydrochloride.

Solutions of aldehydes of the 5-nitrofuran series can be obtained by treating the diacetate derivatives of said aldehydes with a mineral acid with subsequent or simultaneous addition of a monohydric saturated alcohol.

In the course of the reaction there occurs a gradual precipitation of fine crystals of N,N-bis-(2-chloroethyl)-hydrazones of the 5-nitrofuran series.

In order to obtain N,N-bis-(2-chloroethyl)-hydrazones of the 5-nitrofuran series, it is necessary to carry out the reaction at a temperature at least 20° C. below the melting point of the final product, which is determined by the aldehyde used in the reaction.

Carried out at a higher temperature, the reaction could result in the formation of oil-like noncrystalizing products; carried out at a lower temperature the reaction could result in the precipitation of the starting aldehyde and thus in contamination of the final product.

In order to isolate the final product from the reaction mixture it is necessary, upon the completion of the reaction, to add water to said mixture in the amount of approximately ⅕–½ of the total volume of the reaction mixture.

The obtained precipitate is filtered, washed with a 45% solution of a monohydric saturated alcohol, and dried at room temperature.

The yield of the final products, according to the present method, approaches 90% calculated on the basis of starting N,N-bis-(2-chloroethyl)-hydrazine hydrochloride.

The novel chemical compounds N,N-bis-(2-chloroethyl)-hydrazones of the 5-nitrofuran series, synthesized by this method, contain in the side chain from 1 to 4 conjugated vinylidene groups, as well as alkyl and alkoxy groups, and possess strong cytostatic activity against certain types of experimental malignant tumors, for instance, sarcoma 45, Jensen sarcoma, Pliss lymphosarcoma, Walker carcinosarcoma, Guerin carcinoma and alveolar mucoid cancer of the liver RS–1 (PS–1).

For a better understanding of the present invention, the following examples are given of the preparation of said compounds on a laboratory scale.

EXAMPLE 1

5'-nitro-2'-furfural-N,N'-bis-(2-chloroethyl)-hydrazone ($n=0$)

To a solution of 7.28 g. (0.051 mole) of 5-nitrofurfural in 100 ml. of isopropyl alcohol was added a solution of N,N-bis-(2-chloroethyl)-hydrazine hydrochloride (10 g., 0.051 mole) in 40 ml. of water. The temperature of the reaction mixture should not exceed 25° C.; pH, 2.2.

The reaction mixture was kept for 2 hours at room temperature, after which 20 ml. of water was added to it and the resultant mixture was kept for another 2–3 hours at the same temperature. The formed residue was filtered, washed with 45%-ethanol, and dried at room temperature. The yield of the final product was 10.6 g. (73% of theory).

The obtained compound is an orange-colored crystalline substance, which is practically insoluble in water, slightly soluble in ethanol and ether, and readily soluble in dimethyl-formamide and in acetone; M.P. (from dimethyl-formamide-ethanol-water), 67.5–68° C.

Calculated for $C_9H_{11}Cl_2N_3O_3$ (percent): C, 38.57; H, 3.93; Cl, 25.31; N, 15. Found (percent): C, 38.36; H, 4.1; Cl, 25.47; N, 15.02.

EXAMPLE 2

β-(5'-nitro-2'-furyl)-acrylal-N,N-bis-(2-chloroethyl)-hydrazone ($n=1$; R=H)

To a solution of 5.36 g. (0.032 mole) of β-(5-nitro-2-furyl)-acrolein in 200 ml. of ethanol were added 6.0 g. (0.031 mole) of N,N-bis-(2-chloroethyl)-hydrazine hydrochloride in 40 ml. of water. The temperature of the reaction mixture should not exceed 30–40° C.; pH, 2.1.

The reaction mixture was kept at room temperature for 2 hours, after which 50 ml. of water was added to it and the mixture obtained was kept for another 2–3 hours at the same temperature. The precipitate formed was filtered, washed with 50 ml. of 45% ethanol, and dried at room temperature. The yield of the final product was 8.2 g. (86% of theory).

The compound obtained is a crystalline red-orange substance, which is insoluble in water, slightly soluble in ethanol and ether, soluble in polyethylene glycol—400, and readily soluble in acetone and dimethyl formamide; M.P. (from dimethylformamide-ethanol-water), 84.5–85.5° C.

Calculated for $C_{11}H_{13}Cl_2N_3O_3$ (percent): C, 43.15; H, 4.28; Cl, 23.16; N, 13.72. Found (percent): C, 43.08; H, 4.40; Cl, 23.31; N, 13.77.

EXAMPLE 3

5-(5'-nitro-2'-furyl)-2,4-pentadienal-N,N-bis-(2''-chloroethyl)-hydrazone ($n=2$; $R=H$)

To a solution of 1.93 g. (0.01 mole) of 5-(5'-nitro-2'-furyl)-2,4-pentadienal in 100 ml. of methanol were added 1.93 g. (0.01 mole) of N,N-bis-(2-chloroethyl)-hydrazine hydrochloride dissolved in 30 ml. of water. The temperature of the reaction mixture should not exceed 50° C.; pH, 2.2.

The reaction mixture was kept for 10 hours at room temperature, after which 30 ml. of water was added and the resultant mixture was kept for another 3 hours at the same temperature. The formed residue was filtered off, washed with 30 ml. of 45% ethanol, and dried at room temperature.

The yield of the final product was 2.85 g. (85% of theory); M.P. (from dimethylformamide-ethanol-water), 93–94° C.

Calculated for $C_{13}H_{15}Cl_3N_3O_3$ (percent): C, 47.00; H, 4.55; Cl, 21.34; N, 12.65. Found (percent): C, 47.21; H, 4.77; Cl, 21.06; N, 12.45.

EXAMPLE 4

7-(5'-nitro-2-furyl)-2,4,6-heptatrienal-N,N-bis-(2''-chloroethyl)-hydrazone ($n=3$; $R=H$)

To a solution of 1.9 g. (0.009 mole) of 7-(5'-nitro-2'-furyl)-2,4,6-heptatrienal in 300 ml. of ethanol was added a solution of 1.78 g. (0.009 mole) of N,N-bis-(2-chloroethyl)-hydrazine hydrochloride in 50 ml. of water. The temperature of the reaction mixture should not exceed 78° C.; pH, 1.9.

The reaction mixture was kept for 3–4 hours at room temperature, after which 50 ml. of water was added and the resultant mixture was kept for another 2 hours at the same temperature. The formed residue was filtered, washed with 40 ml. of 45% ethanol, and dried at 50° C. The yield of the final product was 2.93 g. (84% of theory); M.P. (from dimethylformamide-ethanol-water), 104–105° C.

Calculated for $C_{15}H_{17}Cl_2N_3O_3$ (percent): C, 50.29; H, 4.78; Cl, 19.80; N, 11.73. Found (percent): C, 50.29; H, 4.75; Cl, 19.57; N, 11.80.

EXAMPLE 5

9-(5'-nitro-2'-furyl)-2,4,6,8-nonatetraenal-N,N-bis-(2''-chloroethyl)-hydrazone ($n=4$; $R=H$)

To a solution of 1.98 g. (0.007 mole) of 9-(5'-nitro-2'-furyl)-2,4,6,8-nonatetraenal in 250 ml. of ethanol was added a solution of 1.48 g. (0.007 mole) of N,N-bis-(2-chloroethyl)-hydrazine hydrochloride in 40 ml. of water. The reaction mixture should be kept at 75° C.; pH, 1.8.

The reaction mixture was kept for 3 hours at room temperature, after which 60 ml. of water was added and the resultant mixture was kept for another 3 hours at the same temperature. The formed residue was filtered off, washed with 30 ml. of 40% ethanol, and dried at 50° C. The yield of the final product was 1.8 g. (61.5% of theory); M.P. (from dimethylformamide - ethanol-water), 136° C.

Calculated for $C_{17}H_{19}Cl_2N_3O_3$ (percent): C, 53.13; H, 4.98; Cl, 18.4; N, 10.93. Found (percent): C, 53.37; H, 5.04; Cl, 18.14; N, 10.86.

EXAMPLE 6

α-Methyl-β-(5'-nitro-2'-furyl)-acrylal-N,N-bis-(2-chloroethyl)-hydrazone ($n=1$; $R=CH_3$)

A solution consisting of 20 g. of sulfuric acid (sp. gr. 1.84), 150 ml. of ethanol, and 20 ml. of water was heated to 70° C., after which there was added to the solution 13.0 g. (0.045 mole) of α-methyl-β-(5 - nitro - 2 - furyl) acroleindiacetate, and the reaction mixture while being stirred was kept from 20 minutes at 75–79° C. Said reaction mixture was cooled to 30° C., and then there was added thereto a solution of 8.83 g. (0.045 mole) of N,N-bis-(2-chloroethyl)-hydrazine hydrochloride in 50 ml. of water, and the obtained mixture was kept for 5–6 hours at room temperature. The formed residue was filtered, washed with 45% ethanol until it was no longer acidic, and dried at room temperature. The yield of the final product was 13.1 g. (90% of theory); M.P. (from dimethylformamide-ethanol-water), 91° C.

Calculated for $C_{12}H_{15}Cl_2N_3O_3$ (percent): C, 45.02; H, 4.72; Cl, 22.15; N, 13.12. Found (percent): C, 45.27; H, 4.99; Cl, 21.90; N, 13.22.

EXAMPLE 7

α-Ethyl-β-(5'-nitro-2'-furyl)-acrylal-N,N-bis-(2-chloroethyl)-hydrazone ($n=1$; $R=C_2H_5$)

A solution consisting of 15 g. of sulfuric acid (sp. gr. 1.84), 80 ml. of ethanol, and 10 ml. of water was heated to 70° C., after which was added 5.94 g. (0.02 mole) of α-ethyl-β-(5-nitro-2-furyl)-acroleindiacetate. Then the reaction mixture, while being constantly stirred, was kept at 75–79° C. for 20 minutes, after which it was cooled to 30° C. and there was added thereto 3.86 g. (0.02 mole) of N,N-bis-(2-chloroethyl)-hydrazine hydrochloride in 30 ml. of water. The resultant mixture was kept at room temperature for 5–6 hours. The formed residue was filtered, washed with 40% ethanol until free of acid reaction, and dried at room temperature. The yield of the final product was 4.55 g. (68% of theory); M.P. (from dimethylformamide-ethanol-water), 73.5° C.

Calculated for $C_{13}H_{17}Cl_2N_3O_3$ (percent): C, 46.71; H, 5.13; Cl, 21.2; N, 12.57. Found (percent): C, 46.99; H, 5.32; Cl, 21.05; N, 12.72.

EXAMPLE 8

α-Ethoxymethyl-β-(5'-nitro-2'-furyl)-acrylal-N,N-bis-(2-chloroethyl)-hydrazone ($n=1$; $R=CH_2OC_2H_5$)

A solution of 20 g. of sulfuric acid (sp. gr. 1.84), 200 ml. of ethanol, and 30 ml. of water was heated to 70° C., and there was added thereto 14 g. of crude oil-like α- ethoxymethyl-β-(5-nitro-2-furyl)-acroleindiacetate. The resultant mixture, while being constantly stirred, was kept at 75–79° C. for 20 minutes, after which the reaction mixture was treated with charcoal. Then the charcoal was filtered off, and the solution was cooled to 20° C., and to it was added 8.0 g. (0.041 mole) of N,N-bis-(2-chloroethyl)-hydrazine hydrochloride in 40 ml. of water. The reaction mixture was kept for 5–6 hours at room temperature. The formed residue was filtered, washed with 40% ethanol until free of acid reaction, and dried at room temperature. The yield of the final product was 8.0 g.

(53% based on the starting N,N-bis-(2-chloroethyl)-hydrazine hydrochloride); M.P. (from dimethylformamide-ethanol-water), 85° C.

Calculated for $C_{14}H_{19}Cl_2N_3O_4$ (percent): C, 46.16; H, 5.26; Cl, 19.47; N, 11.53. Found (percent): C, 46.37; Cl, 19.60; N, 11.86.

EXAMPLE 9

α-Isopropyl-β-(5'-nitro-2'-furyl)-acrylal-N,N-bis-(2-chloroethyl)-hydrazone ($n=1$; $R=C_3H_7$)

A mixture of 25 g. of sulfuric acid (sp. gr. 1.84), 150 ml. of ethanol, and 20 ml. of water was heated to 70° C. Then, there were added 13.4 g. of crude oil-like α-isopropyl-β-(5-nitro-2-furyl)-acroleindiacetate to the mixture. The resultant mixture, while being stirred, was kept at 75–79° C. for 20 minutes, after which the reaction mixture is treated with charcoal. Then the charcoal was filtered off, and to the solution cooled to 20° C. was added 8.0 g. (0.041 mole) of N,N-bis(2-chloroethyl)-hydrazine hydrochloride in 40 ml. of water.

The reaction mixture was kept for 5–6 hour at room temperature. The formed residue is filtered, washed with 40 ethanol until free of acid reaction, and dried at room temperature. The yield of the final product was 5.1 g. (35.9% based on the starting N,N-bis-(2-chloroethyl)-hydrazine hydrochloride); M.P. (from dimethylformamide-ethanol-water), 52.5–53.0° C.

Calculated for $C_{14}H_{19}Cl_2N_3O_3$ (percent): C, 48.27; H, 5.51; Cl, 20.36; N, 12.07. Found (percent): C, 47.97; H, 5.40; Cl, 20.50; N, 12.32.

What is claimed is:

1. A compound of the formula:

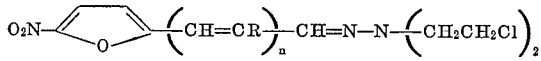

wherein $n$ is an integer between 0 and 4 and when $n$ is other than 0, R is hydrogen, lower alkyl or ethoxymethyl.

2. A compound according to claim 1 wherein $n$ is 0.
3. A compound according to claim 1 wherein $n$ is an integer between 1 and 4.
4. A compound according to claim 3 wherein the lower alkyl is methyl, ethyl or isopropyl.

5. A method for producing a compound of the formula:

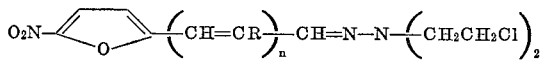

wherein $n$ is an integer between 0 and 4 and when $n$ is other than 0, R is hydrogen, lower alkyl or ethoxymethyl, said method comprising mixing an aqueous solution of N,N-bis-(2-chloroethyl)-hydrazine hydrochloride with a water-miscible, lower alkanol solution of an aldehyde of the formula:

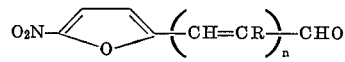

wherein $n$ and R are as defined above, at a temperature at least 20° C. below the melting point of the desired compound.

6. A method according to claim 5 wherein $n$ is 0.
7. A method according to claim 5 wherein $n$ is an integer between 1 and 4.
8. A method according to claim 7 wherein the lower alkyl is methyl, ethyl or isopropyl.
9. A method according to claim 5 wherein the water-miscible, lower alkanol is methol, ethanol or isopropanol.
10. A method according to claim 5 wherein the aldehyde is formed from the corresponding diacetate derivative of the aldehyde in situ by hydrolyzing said diacetate derivative with a mineral acid.
11. A method according to claim 10 wherein the mineral acid is sulfuric acid.
12. A method according to claim 10 wherein the said hydrolyzing is effected in the presence of a water-miscible, lower alkanol.
13. A method according to claim 12 wherein the water-miscible, lower alkanol is methanol, ethanol or isopropanol.

References Cited

UNITED STATES PATENTS 3,427,329    2/1969    Burch _____ 260—347.7

ALEX MAZEL, Primary Examiner

B. I. DENTZ, Assistant Examiner

U.S. Cl. X.R.

424—285